(12) United States Patent
Grace

(10) Patent No.: US 10,373,455 B1
(45) Date of Patent: Aug. 6, 2019

(54) THEFT DETECTION SYSTEM

(71) Applicant: Rodney Anthony Grace, Greenwich, CT (US)

(72) Inventor: Rodney Anthony Grace, Greenwich, CT (US)

( * ) Notice: Subject to any disclaimer, the term of this patent is extended or adjusted under 35 U.S.C. 154(b) by 0 days.

(21) Appl. No.: 16/056,730

(22) Filed: Aug. 7, 2018

(51) Int. Cl.
  *G08B 13/14* (2006.01)
  *G07C 9/00* (2006.01)
  *G01S 19/16* (2010.01)
  *H04N 7/18* (2006.01)

(52) U.S. Cl.
  CPC .......... *G08B 13/1436* (2013.01); *G01S 19/16* (2013.01); *G07C 9/00134* (2013.01); *H04N 7/185* (2013.01)

(58) Field of Classification Search
  CPC ..... G08B 13/14; G01S 19/16; G07C 9/00134; H04N 7/185
  USPC ............................... 340/568.1, 571
  See application file for complete search history.

(56) References Cited

U.S. PATENT DOCUMENTS

| | | | |
|---|---|---|---|
| 6,950,540 B2 | 9/2005 | Higuchi | |
| 7,061,378 B2 * | 6/2006 | Lawrenson | G08B 13/1436 340/568.1 |
| 7,064,667 B2 * | 6/2006 | Sosna | G08B 13/149 340/541 |
| 7,323,967 B2 | 1/2008 | Booth et al. | |
| 7,855,642 B2 | 12/2010 | Veiga, III | |
| 9,609,932 B2 * | 4/2017 | Mercado | A45C 13/18 |
| 9,955,050 B2 * | 4/2018 | Warren | H04N 5/2252 |
| 9,972,182 B2 * | 5/2018 | Warren | G08B 13/22 |
| 2014/0109631 A1 | 4/2014 | Asquith et al. | |
| 2014/0210622 A1 | 7/2014 | Bailey | |
| 2018/0255894 A1 * | 9/2018 | Knittel | A45C 13/18 |

* cited by examiner

*Primary Examiner* — Toan N Pham
(74) *Attorney, Agent, or Firm* — Dale J. Ream

(57) ABSTRACT

A theft detection system includes a portable security device having a casing and a motion sensor operable to detect a movement of the casing. A transmitter positioned in the casing transmits a theft alert signal motion is detected. The theft detection system includes a software application running on a mobile communications device remote from the portable security device that receives the theft alert signal and initiates a theft alert action, such as energizing an alarm or transmitting an alert and GPS coordinates, if the theft alert signal is indicative of unauthorized movement of the portable security device. The theft detection system may also include a fixed-position security device and a supplemental motion sensor. If motion is detected inside the housing and entry to the housing cannot be authenticated, the fixed-position security device will make a theft-alert action, such as sounding an alarm, transmitting an alert signal.

18 Claims, 11 Drawing Sheets

THEFT DETECTION SYSTEM

BACKGROUND OF THE INVENTION

This invention relates generally to security tracking or detection devices and, more particularly, to a theft detection system that detects movement and potential theft of a portable security device as well as detecting unauthorized access to a fixed-position security device.

There are two types of theft that are common within a fixed boundary facility such as a gym or workout facility (although the gym environment is only one of many applications in which the present invention is applicable). One type of theft involves the unauthorized taking of a person's bag, purse, backpack, or the like has been placed in a cubby, unlocked locker, or simply along a wall of an aerobics class or weight room. Another type of theft in such a facility is where a locker having a padlock or combination lock is pried open or the lock is cut off with cable cutters and unauthorized access results in a theft of the contents therein.

While products like luggage tracking devices and motion sensors are generally known in the art, there is no theft detection system that is particularly suited to the scenario described above. For instance, the present devices and prior patent proposals cannot detect and track movement of a bag situated both in a locked storage housing as well as one merely positioned in an unattended or unlocked storage location. Stated another way, the existing proposals do not track movement of a portable security device and movement within a locked housing—both of which may be indicative of a theft condition.

Therefore, it would be desirable to have a theft detection system that includes a portable security device operable to detect unauthorized movement of any bag into which the portable security device is placed. Further, it would be desirable to have a theft detection system that includes a fixed-position security device that detects unauthorized access to and movement within its interior area. In addition, it would be desirable to have a theft detection system that is operable to transmit a notification signal to a software application running on the owner's mobile telephone that gives a potential threat alert, enables fast action theft prevention, or otherwise activates an alarm.

SUMMARY OF THE INVENTION

A theft detection system according to the present invention includes a portable security device having a casing and a motion sensor operable to detect a movement of the casing. A transmitter is positioned in the casing that is operable to transmit a theft alert signal when energized by the motion sensor. The theft detection system includes a software application running on a mobile communications device remote from the portable security device. The software application is operable to receive the theft alert signal and to initiate a theft alert action, such as energizing an alarm or transmitting an alert and GPS coordinates, if the theft alert signal is indicative of unauthorized movement of the portable security device.

The theft detection system may also include a fixed-position security device, such as a locker having a housing defining an interior area capable of receiving the portable security device, a supplemental motion sensor, and other security components. If motion is detected inside the housing and entry to the housing cannot be authenticated, the fixed-position security device will make a theft-alert action, such as sounding an alarm, transmitting an alert signal.

Therefore, a general object of this invention is to provide a theft detection system having a portable security device that may be placed in a purse, backpack, gym bag, etc. that detects if portable security device (and bag) are moved and, if so, notifies the owner or predetermined contact list.

Another object of this invention is to provide a theft detection system, as aforesaid, in which the portable security device is operable to determine its own (and possibly changing) global position and to transmit that location to a mobile application running on a mobile communications device of an owner, for instance, to enable an intercept of a thief.

Still another object of this invention is to provide a theft detection system, as aforesaid, that also includes a fixed-position security device that includes a housing defining an interior area and an motion sensor inside the housing interior area for detecting unauthorized motion inside the housing, i.e. unauthorized access.

Yet another object of this invention is to provide a theft detection system, as aforesaid, in which the housing of the fixed-position security device includes an authentication device that is operable to disable all alarms and theft transmissions if access is confirmed, via the authentication device, to be authorized.

A further object of this invention is to provide a theft detection system, as aforesaid, in which the portable security device and the fixed-position security device include cameras operable to take fixed or video images proximate the devices, respectively, if unauthorized motion is detected.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
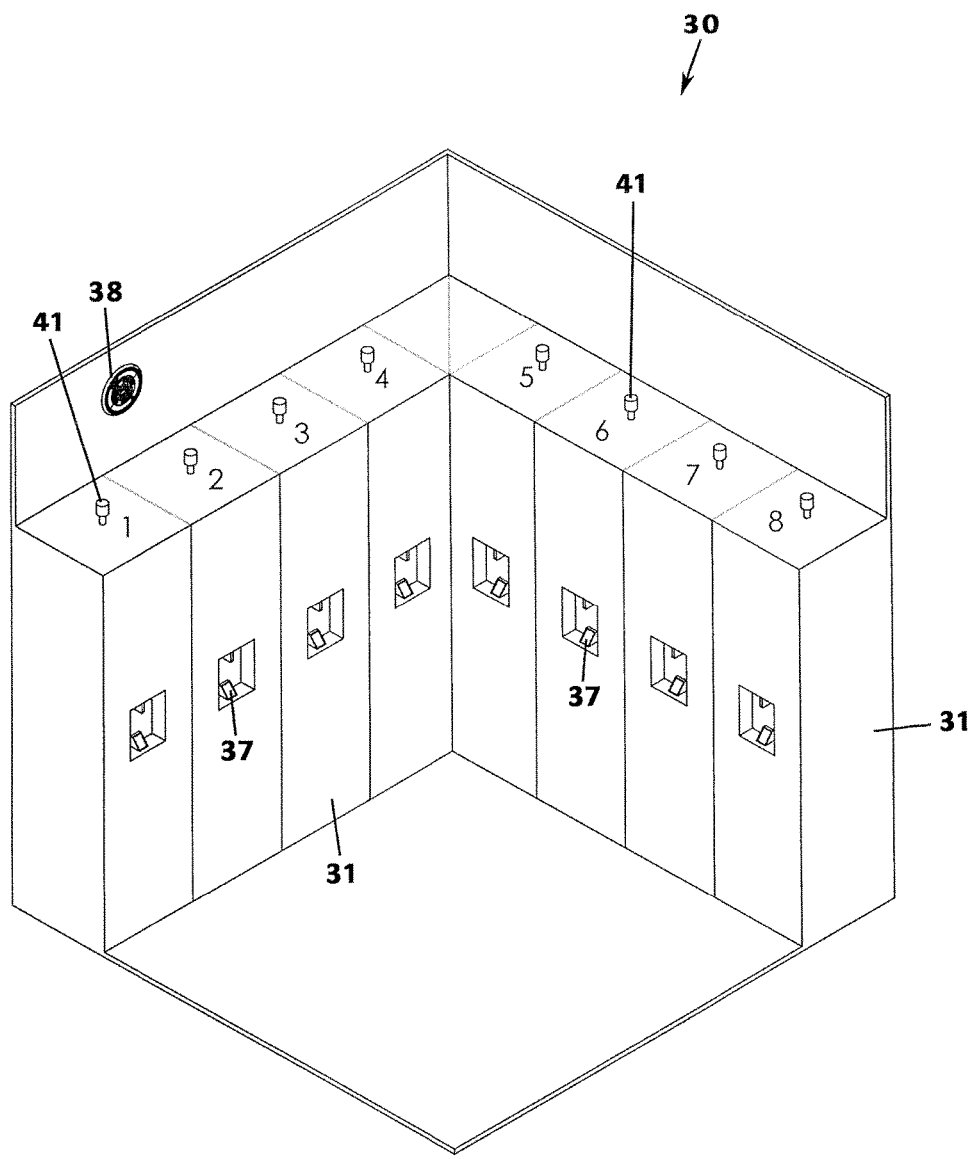
FIG. 1 is a perspective view of a theft detection system according to a preferred embodiment of the present invention, specifically illustrating a fixed-position security device.
Figure 2:
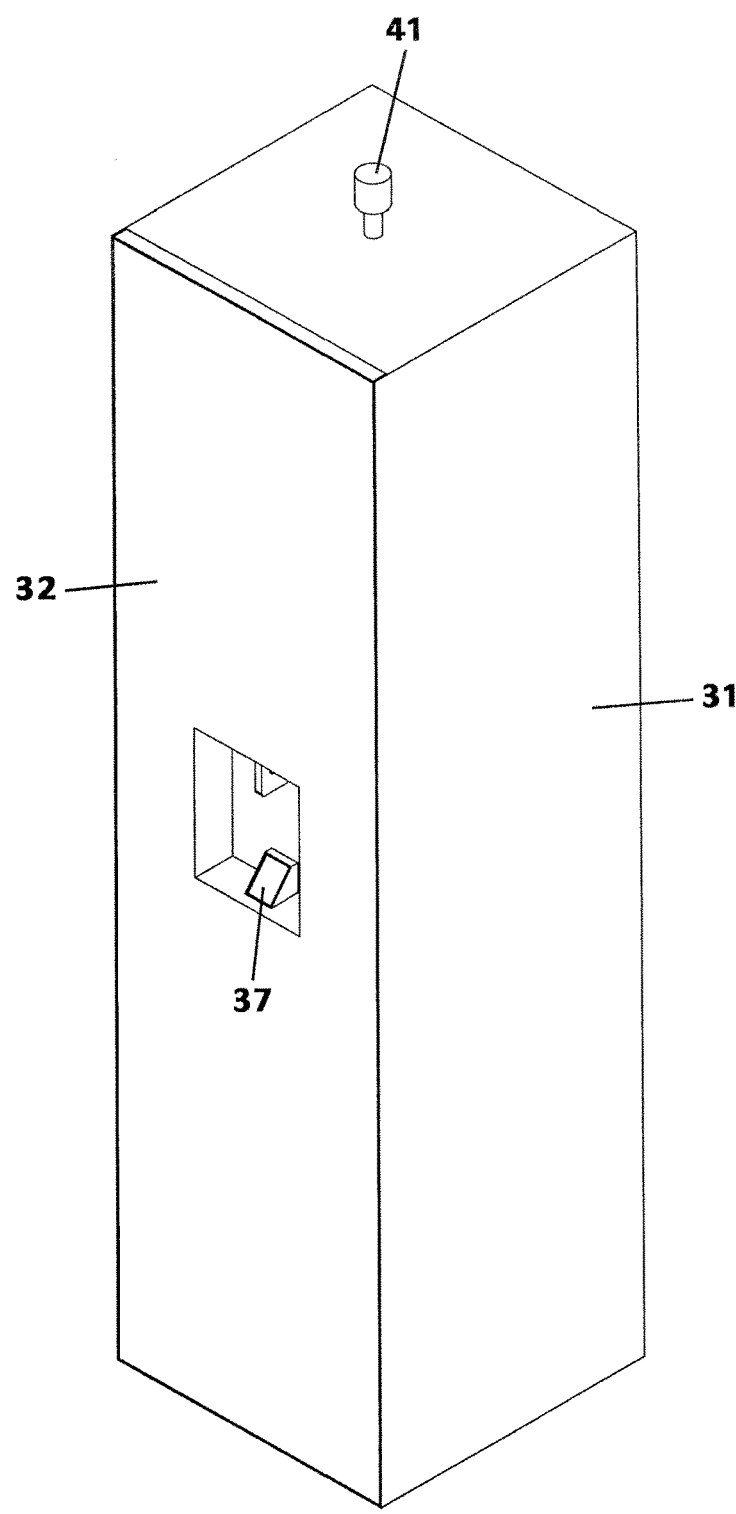
FIG. 2 is an isolated view of a single fixed-position security device of the theft detection system according to the present invention and illustrated in a closed configuration.
Figure 3:
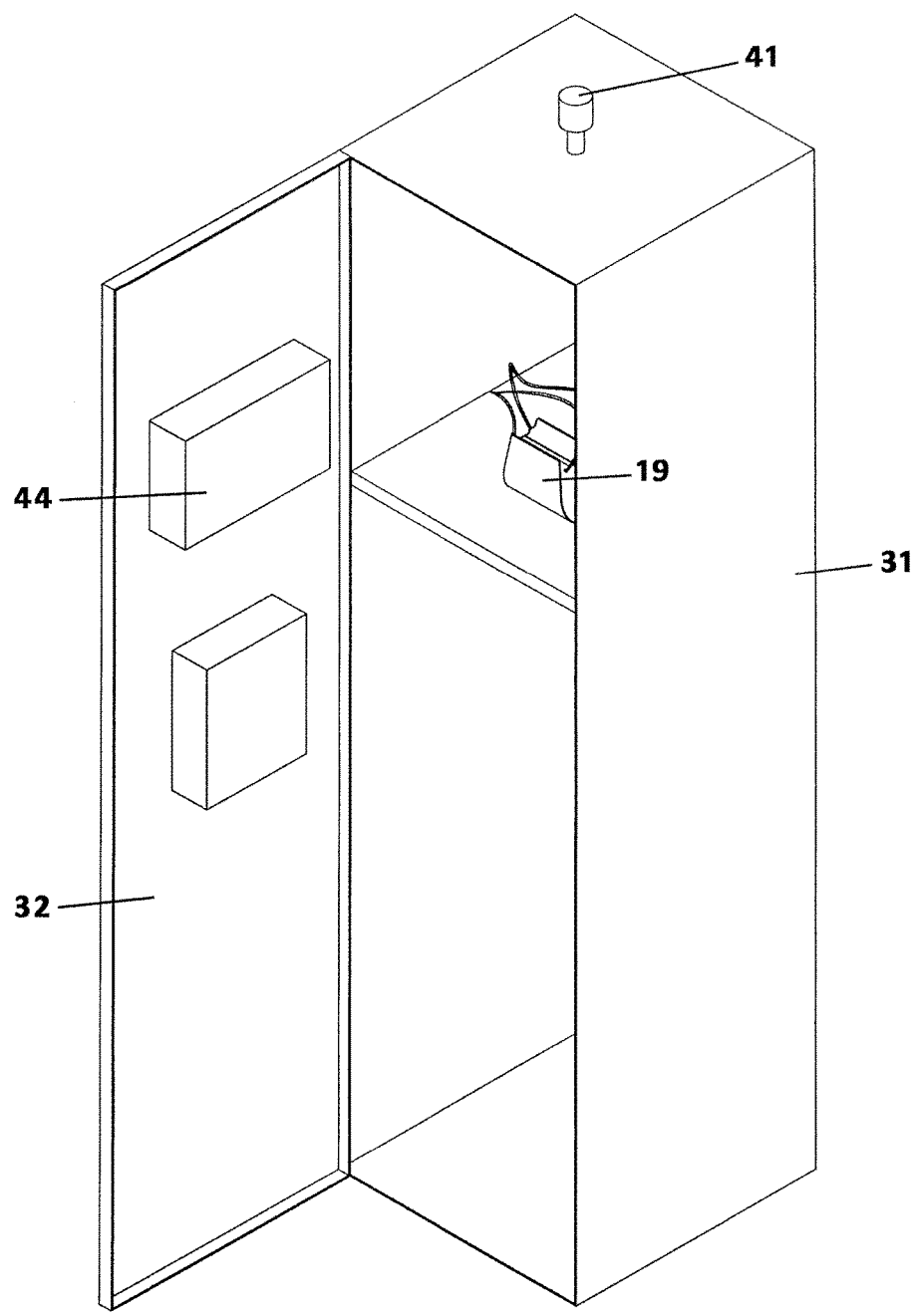
FIG. 3 is an isolated view of the single fixed-position security device of the theft detection system as in FIG. 2 illustrated in an open configuration.
Figure 4:
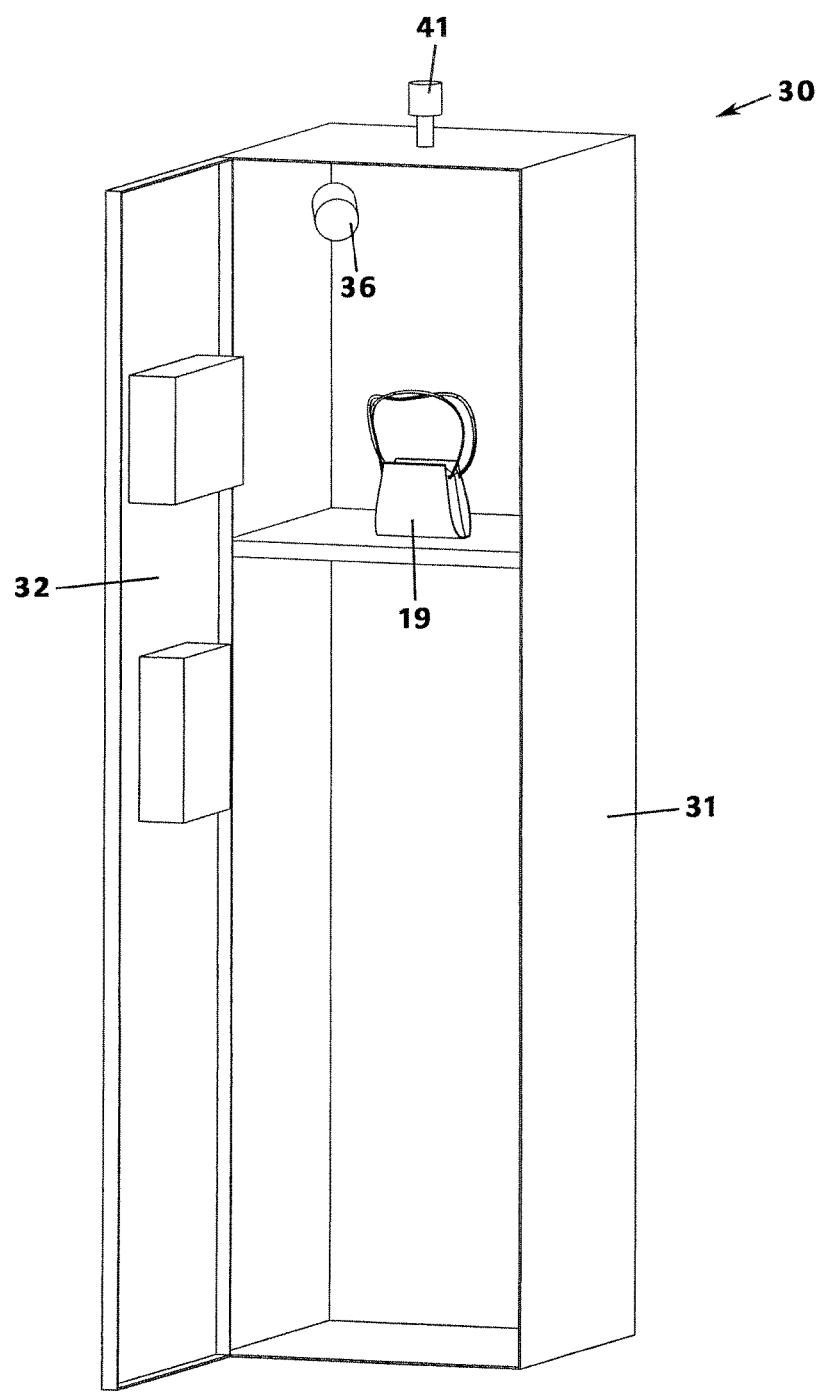
FIG. 4 a front perspective view of the single fixed-position security device of the theft detection system as in FIG. 3.
Figure 5:
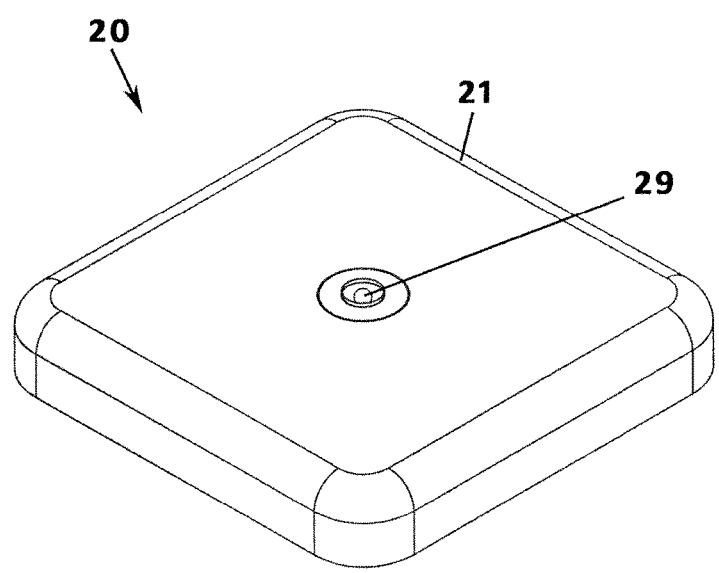
FIG. 5 is an isolated perspective view of a portable security device of the theft detection system according to the present invention.
Figure 6:
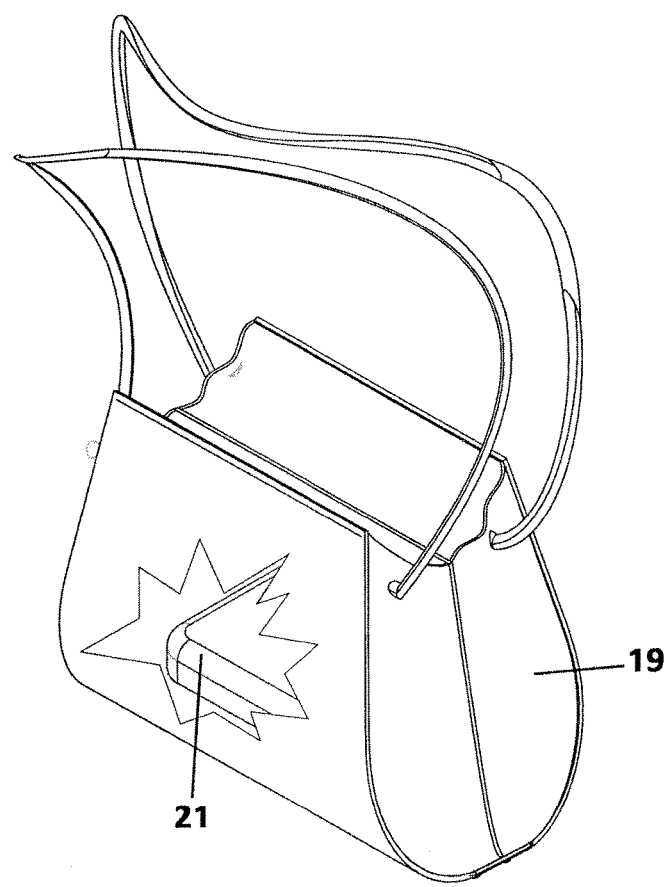
FIG. 6 is an isolated fragmentary view of a purse or handbag illustrated with a side wall being fragmented so as to illustrate receiving the portable security device as in FIG. 5.

A theft detection system according to a preferred embodiment of the present invention will now be described with reference to FIGS. 1 to 12 of the accompanying drawings. The theft detection system 10 includes a portable security device 20, a fixed-position security device 30, and a software application 18 executed by a mobile communications device 12.

Figure 8:
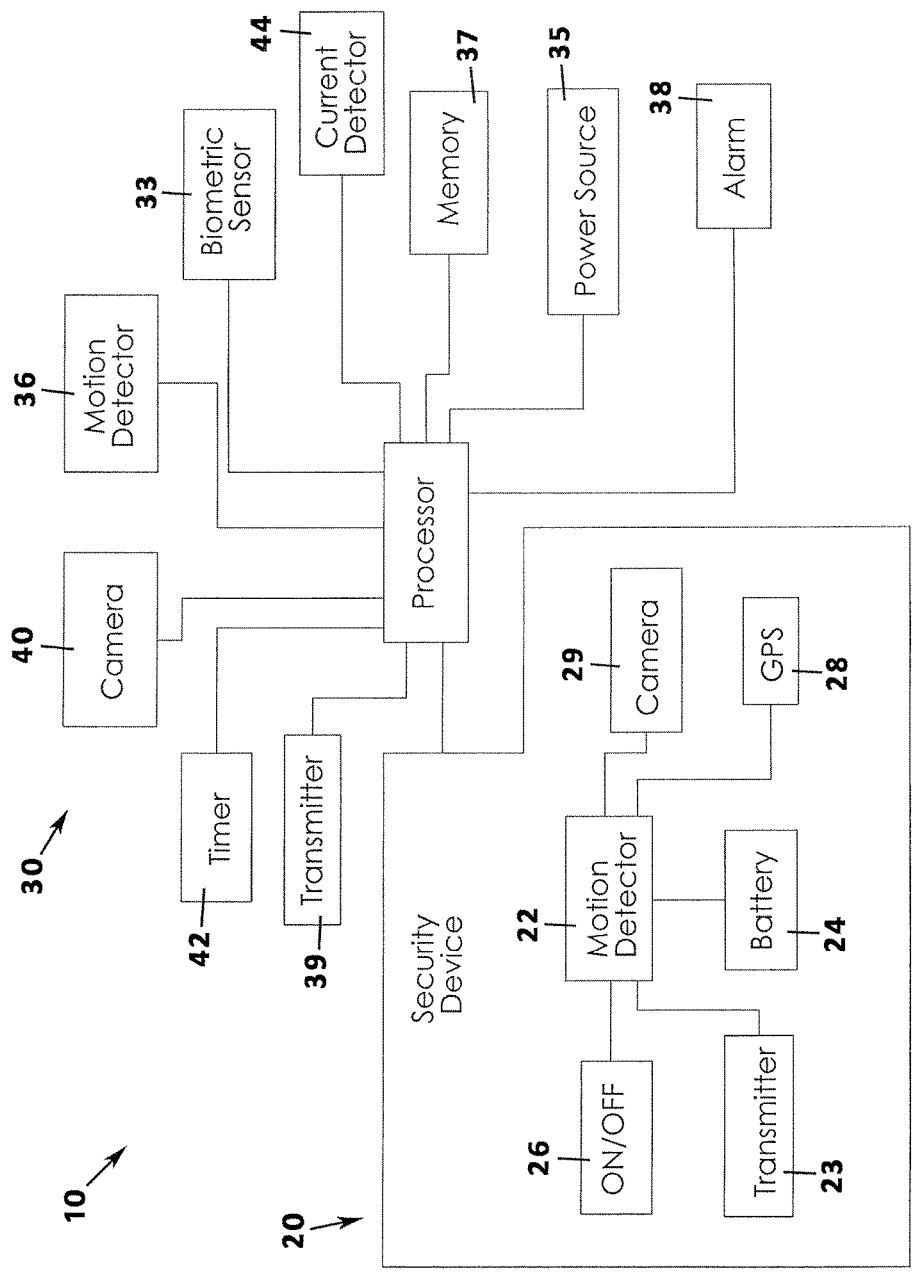
FIG. 8 is a block diagram illustrating the electronic components of the theft detection system according to a preferred embodiment of the present invention.
Figure 9:
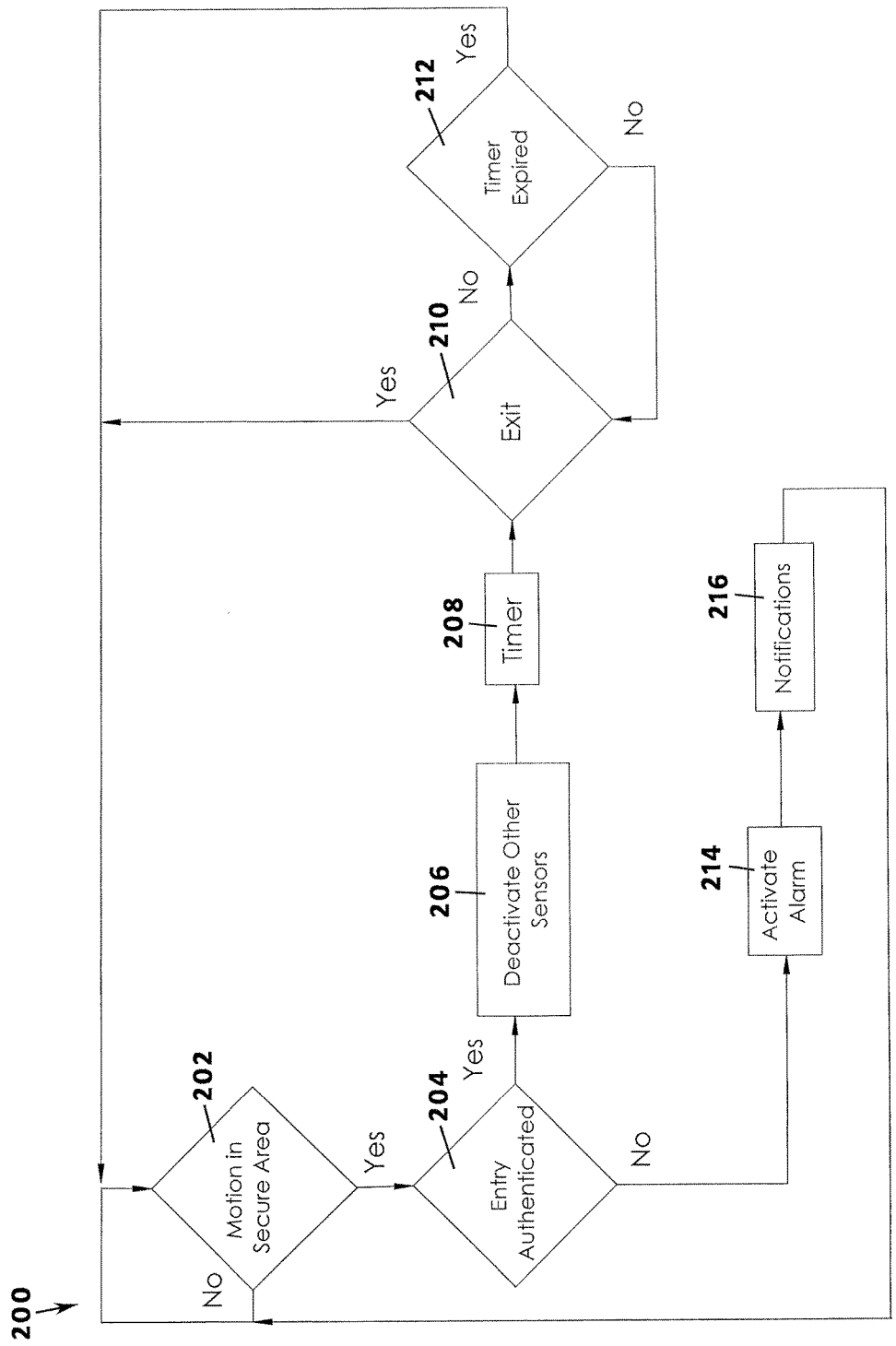
FIG. 9 is a flowchart illustrating an exemplary process of the fixed-position security device of the theft detection system.
Figure 10:
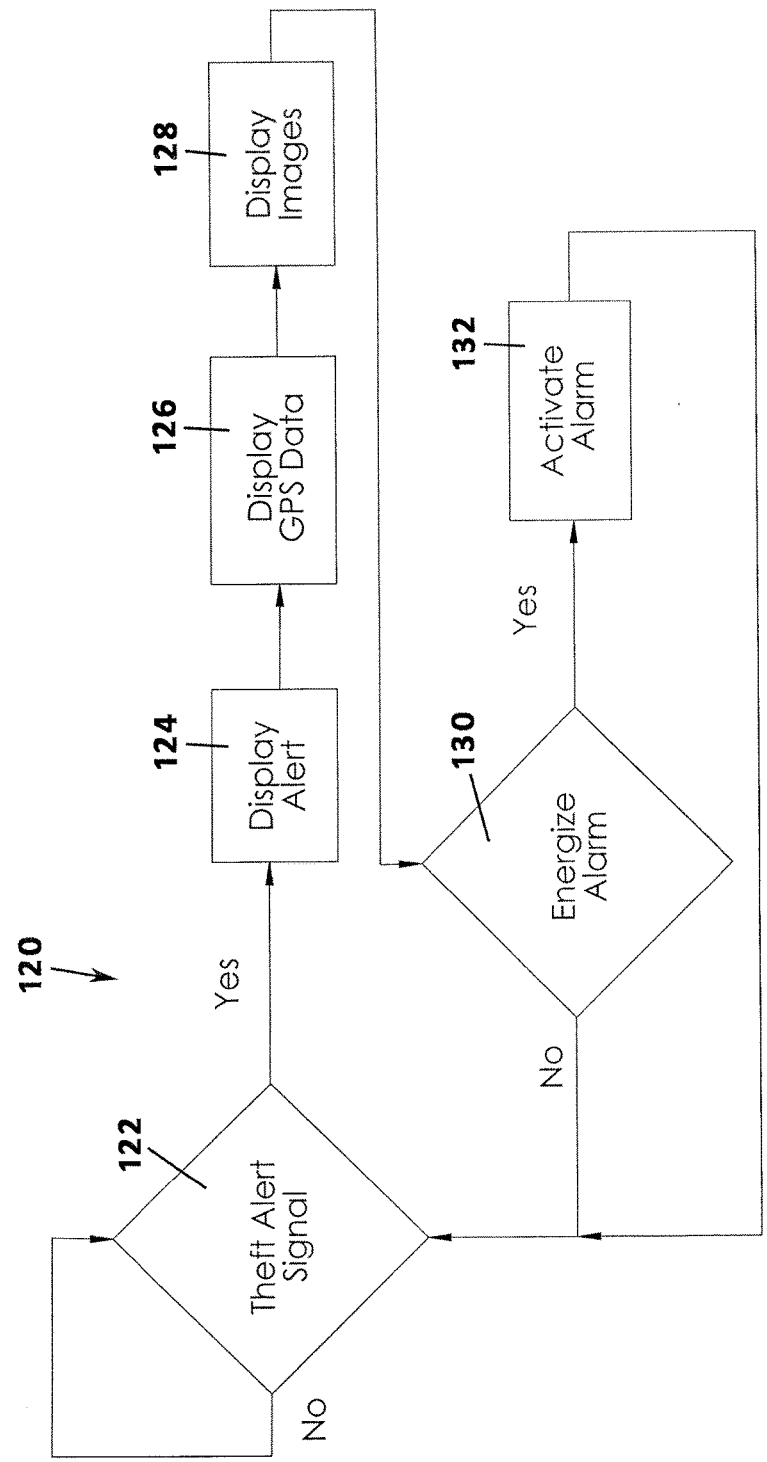
FIG. 10 is a flowchart illustrating the logic executed by a software application of the theft detection system.
Figure 11:
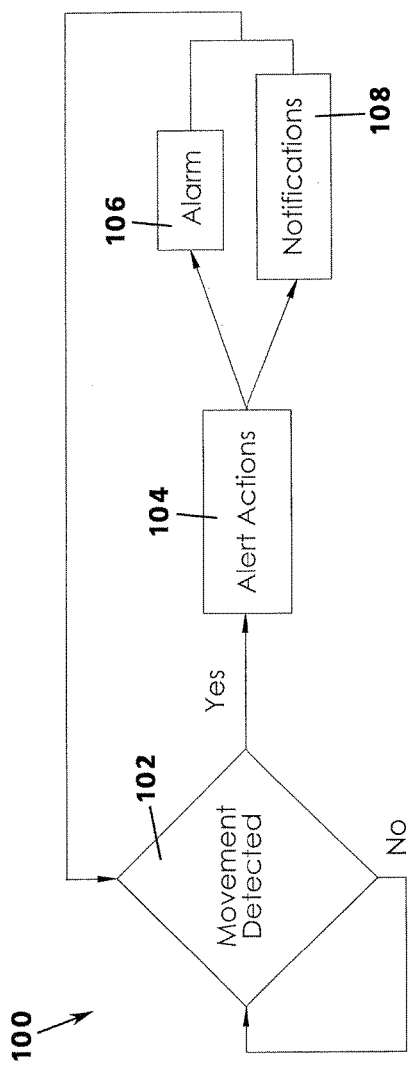
FIG. 11 is a flowchart illustrating an exemplary process of the portable security device of the theft detection system.
Figure 12:
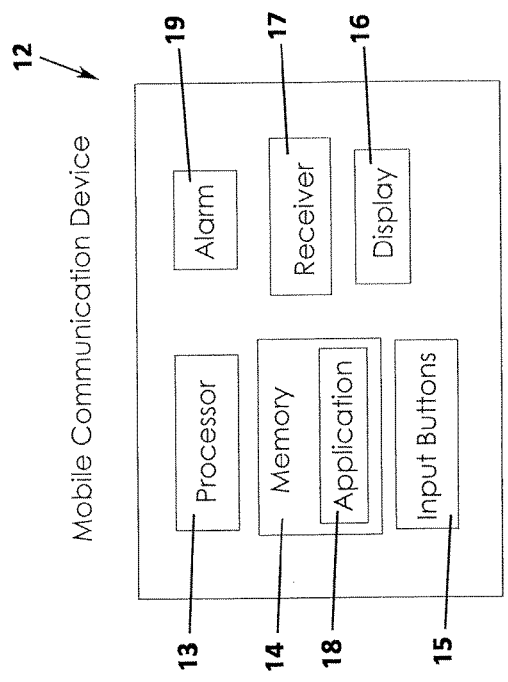
FIG. 12 is a block diagram illustrating the electronic components of a mobile communications device of the theft detection system.

The portable security device 20 includes a casing 21 that may have virtually any shape or size configuration although it is preferably small, sleek, and capable of being placed into a purse 19, gym bag, briefcase, locker, luggage, a folder of papers, a stack of clothing, or anywhere that a user wants to detect if certain objects get moved, carried away, or stolen. The casing 21 may be relatively small and sleek and defines an interior area in which critical electronics are stored. More particularly, the portable security device 20 includes a primary motion sensor 22 (also called a primary motion detector) positioned in the interior area of the casing 21 and is operable to detect movement or motion of the casing 21. Further, a primary transmitter 23 is positioned in the casing 21 and is in electrical communication with the primary motion sensor 22. The primary transmitter 23 is operable, such as through circuitry, wires, a controller, or a processor, to transmit a predetermined primary theft alert signal or actuate a theft alert action when the primary motion sensor 22 detects movement and, as a result, energizes the primary transmitter 23. It is understood that the portable security device 20 may also include a battery 24 operably and electrically connected to the primary motion sensor 22 and primary transmitter 23 and other electronics of the portable security device 20 (FIG. 8). The portable security device 20 may also include an external on/off button 24 operable to supply power to the other components (i.e. in operation) or to disable the device entirely, respectively.

In an embodiment, the portable security device 20 may include additional security related features. Namely, the portable security device 20 may include a global position satellite (GPS) module 28 in data communication with the primary motion sensor 22 and that is operable to determine very specific and accurate geographic position coordinates associated with the location of the casing 21. The circuitry is operable such that the GPS coordinates may be transmitted in real time by the primary transmitter 23 simultaneously with transmission of the theft alert signal or theft alert action described above. In use, this enables the moved or still-moving casing 21 to be tracked in real time on the software application 18 running on the mobile communications device 12 or by other predetermined security authorities as will be described later in more detail.

Further, the portable security device 20 may include a primary camera 29 situated on an external wall of the casing 21 and that is in electrical communication with the primary motion sensor 22 (FIG. 8). The primary camera 29, when energized, is operable to take still photographs or streaming video in or around the casing 21. The circuitry or wireless connection between the primary camera 29 and primary motion sensor 22 causes the primary camera 29 to operate when motion is detected. The camera images may also be transmitted by the primary transmitter 23 simultaneously with the alert signal and GPS coordinates described above and, thus, enables the owner or other security personnel to positively identify the alleged thief—hopefully upon intercepting him in real time but also at a later date if necessary.

The theft detection system 10 includes a fixed-position security device 30 having a housing 31 or, in some embodiments, a plurality of housings. The housing 31 may be in the form of a gym locker as shown in the figures or, in other applications, may be an airport locker, a post office box, a private delivery container, or other storage location. In most instances, there will be a plurality of identical or substantially similar storage containers for similar use by multiple individuals (FIG. 1). Each housing 31 defines an interior space for storage of articles placed therein for safekeeping by an authorized user, such as a wallet, keys, or personal items by a member of an exercise facility. Further, each housing 31 may be associated with an identification code such as a locker number, mailbox identifier, or the like. In other words, the present system is a "smart" system so that the alert signal is able to identify the specific housing (such as a locker) has been broken into or otherwise entered without authorized access.

It is understood that a door 32 that is pivotal between open and closed positions regulates authorized access to the interior area of the housing 31 and may be operational by means of an authentication device. Suitable authentication devices may include a combination lock, a key lock, a biometric sensor 36 as shown in the figures, a retinal retina scanner, a fingerprint sensor, a facial scanner, or the like. The authentication device, when electronic, is in data communication with a processor 34 via wires, circuitry, or wireless connection for communicating authentication data thereto for comparison with stored authentication code data. If the authentication is validated or confirmed, the door 32 is opened and access to the interior area is allowed.

Further, the fixed-position security device 30 may include a current detector 44 mounted to the housing 31, such as to the door 32, and may be electrically connected to the authentication device (shown in the figures as a biometric sensor 33) and to the processor 34. It is understood that the connection of these components may operate an electrical circuit and the current detector 44 is operable to detect when the cycling current of the circuit is interrupted, i.e. when the circuit is severed anywhere along its path. A legitimate assumption may be made that a severance of this current may indicate a lock or authentication device has been vandalized, cut off, or otherwise damaged or destroyed by a thief intending to gain entry to the interior of the housing 31.

Similar to the contents of the portable security device 20 described above, the fixed-position security device 30 may include security components for monitoring authorized versus apparent or alleged unauthorized access to the interior area of the housing 31. The fixed-position security device 30 may be electrically connected to an electrical power source 35 such as an A/C wall socket, a battery, or the like and the electronics and electrical components described below are wired to receive electricity from the power source 35. More particularly, the fixed-position security device 30 may include a supplemental motion sensor 36, positioned in the interior area or on a side wall or upper wall thereof and which may also be referred to as a motion detector or "another" motion sensor. Rather than detecting movement of the housing 31 itself, the supplemental motion sensor 36 is operable to detect movement within or inside the interior area. For instance, if the authentication code has not been validated (i.e. the door has not been accessed or opened via a predetermined authentication procedure) yet motion or movement is detected within the interior area, then it may be deduced that the door has perhaps been pried open or a lock has been pinched off and removed with wire cutters or the like. The specific details of a security methodology carried out by circuitry or a processor 34 of the fixed-position security device 30 will be described below in more detail.

More particularly, the fixed-position security device 30 may include processor 34 or similar circuitry such as a controller and may include non-volatile storage media such as a non-volatile memory 37 in data communication with the processor 34. The memory 37 is configured to store programming instructions to carry out the security methodology described above as well as storing predetermined authentication data used for regulating access to the interior area of the housing 31. The supplemental motion sensor 36 described above is also positioned within the interior area and is in data communication with the processor 34 and the power source 35. When the supplemental motion sensor 36 detects movement within the interior area of the housing, it communicates this detection to the processor 34 which then determines if the motion is the result of authorized and authenticated access or, by contrast, may be the result of unauthorized access such as a break-in. Further, an audio or visual alarm 38 may be mounted to an exterior of the housing 31 or even at a remote location, e.g. a security desk or security panel and may be in data communication with the processor 34. Accordingly, the alarm 38 may be energized when unauthorized access to the interior area of the housing 31 is detected. It is understood that the alarm may be a single alarm 38 that alerts if any of a plurality of housings 31 have been improperly entered or each individual housing 31 may include a dedicated alarm 41 so that housing in question can be immediately identified. In some embodiments, the alarm 38 or 3' may be a "silent alarm" so as to illuminate a remote security panel, call the police, or alert the owner's cell phone via the mobile software application when a potential theft is detected. In the case of notifying a contact remote from the housing 31, the fixed-position security device 30 may include a transmitter (referred to as a supplemental transmitter 39 for clarity) that is operable to transmit a theft threat alert signal into the ambient air when the supplemental motion sensor 36 detects unauthorized movement and energizes the supplemental transmitter 39 to transmit an alert signal accordingly.

Similar to the camera described above with regard to the portable security device 20, the fixed-position security device 30 may include a supplemental camera 40 positioned in the interior area of the housing 31 and in data communication with the processor 34 or directly in communication with the supplemental motion sensor 36. The supplemental camera 40 is operable to take still photographs or streaming video in or around the housing 31. The circuitry or wireless connection between the supplemental camera 40 and supplemental motion sensor 36 causes the supplemental camera 40 to operate when motion is detected. The supplemental camera 40 images may also be transmitted by the supplemental transmitter 39 simultaneously with the alert signal and, thus, enables the owner or other security personnel to positively identify the alleged thief—hopefully by intercepting him in real time but also at a later date if necessary.

In another aspect, a timer 42 may be electrically connected to the processor 34 of the fixed-position security device 30 and is operable to count or measure a predetermined quantity of time when energized. For instance, when the processor 34 determines that access to the interior area of the housing 31 is authorized, such as according to the authentication requirements for entry to the door 32 as described above, the processor 34, under program control, may energize the timer 42 to count for a predetermined amount of time while the alarms and other security components described above are disabled or canceled. Essentially, an amount of time is given for the authorized user to access the housing 31 before the security monitoring thereof is reactivated. In an embodiment where the housing 31 is a gym locker, the authorized user may rightfully access the locker after entering an authentication code and is given a set time wherewith to access it before the locker is again monitored against unauthorized access by others.

A process 100 illustrates the methodology of operation of the portable security device 20. It will be understood that the process 100 may be executed via circuitry or programming as described above. Specifically, at step 102, the process 100 determines if the primary motion sensor 22 has detected movement of the casing 21 and, if so, control is passed to step 104; otherwise, process 100 just cycles again to step 102. At step 104, the alert actions are executed and, as described above, may include energizing an alarm as illustrated at step 106, transmitting notifications of a potential theft at step 108, or both. It is understood, of course, that the alert action may be to transmit an alert signal to a mobile communications device 12 that is executing a software application that is operable to energize the alarm, receive GPS coordinates in real time, receive photographs and video, respectively, as described below. The process 100 returns to step 102 and may be repeated if movement of the casing 21 continues.

Figure 7:
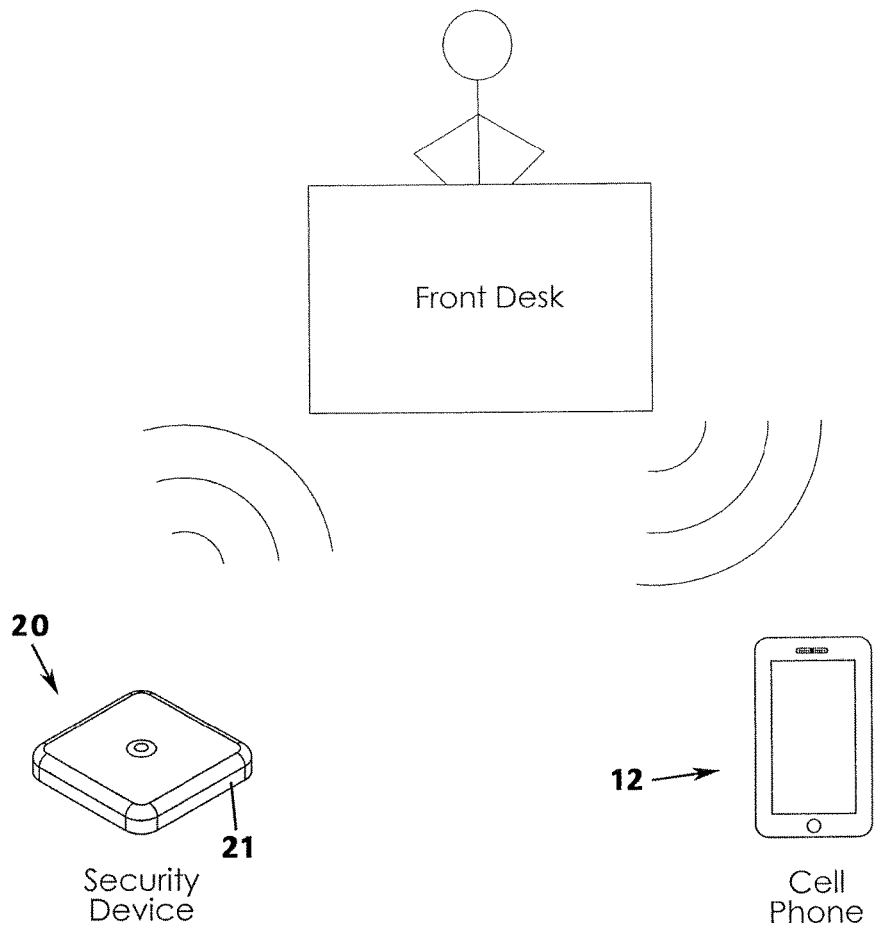
FIG. 7 is a plan view illustrating an exemplary operation of the theft detection system according to a preferred embodiment of the present invention.

It is understood that the mobile communications device 12 shown in FIG. 7 includes traditional functional electronic components like a processor 13, a non-volatile memory 14 in which the mobile software application 18 described in the present invention is stored and in communication with the processor 13, input buttons 15 for entering data, and a graphical display 16. The mobile communications device 12 may also include a receiver 17 operable to receive the theft alert signal as described above as well as GPS data, streaming image data, and the like as described above. A process 120 is illustrative of execution of the methodology of the software application 18 and may be executed by a processor 13 of the mobile communications device 12 according to programming instructions stored in the memory 14 thereof. At step 122, the mobile communications device 12 is operable to determine if a signal is received. If an alert signal is received and identified by a mobile communications device 12 on which the mobile software application 18 is running, process 120 proceeds to display the alert on the graphical display 16 of the mobile communications device 12 and also may display any global position data and camera images accompanying the alert signal as shown in steps 124, 126, and 128 and as described above. The process 120 then proceeds to step 130. At step 130, the process 130 determines if a user desires to energize an alarm 19 and, if so, activates either an audible or visual alarm at step 132.

In use, the theft detection system 10 according to the present invention enables a user to be notified if the portable security device 20 alone is moved, such as if it is placed in a purse or gym bag to be monitored, or if the housing 31 in which the portable security device 20 is initially stored is entered without authorization and its contents moved. In other words, the present invention discloses both a portable security device 20 and the fixed-position security device 30 in which the portable security device 20 may be situated.

It is understood that while certain forms of this invention have been illustrated and described, it is not limited thereto except insofar as such limitations are included in the following claims and allowable functional equivalents thereof.

The invention claimed is:

1. A theft detection system, comprising:
a portable security device having a casing and a motion sensor operable to detect a movement of said casing;
a transmitter positioned in said casing that is operable to transmit a theft alert signal when energized by said motion sensor;
a software application running on a mobile communications device remote from said portable security device and said mobile communications device being of a type having a processor, a non-volatile memory in data communication with said processor and storing programming, and having a receiver, wherein said software application, when executed by said processor, is operable to:
receive said theft alert signal; and
output a theft alert action if said theft alert signal is indicative of unauthorized movement of said portable security device;
a fixed-position security device having a housing defining an interior area, said housing having a door movable between an open configuration allowing access to said interior area and a closed configuration preventing access to said interior area; wherein said fixed-position security device comprising:
a processor in electrical communication with a non-volatile storage device storing additional programming instructions;
a supplemental motion sensor in data communication with said processor and positioned in and operable to detect motion within said interior area of said housing;
an alarm positioned in said housing and operable to emit an audible warning when energized by the supplemental motion sensor or said processor indicating detection of movement in said interior area.

2. The theft detection system as in claim 1, wherein said portable security device includes a camera situated on an outer surface of said casing and operable to record a photograph or video in real time when energized by said motion sensor.

3. The theft detection system as in claim 1, wherein:
said portable security device includes a global position satellite (GPS) module in data communication with said motion sensor and is operable to generate current geographic position data in real time when energized by said motion sensor;
said transmitter of said portable security device is operable to transmit said current geographic position data simultaneously with transmitting said theft alert signal.

4. The theft detection system as in claim 1, further comprising a transmitter positioned in said housing of said fixed-position security device that is operable to transmit a supplemental theft alert signal when energized by said processor or by said supplemental motion sensor that is indicative of detection of unauthorized movement in said interior area.

5. The theft detection system as in claim 4, further comprising:
an authentication device on said door and in electrical communication with said processor and that is operable to receive authentication data from a user,
wherein said processor, when executing said additional programming instructions, is operable to receive said authentication data from said authentication device and, if said authentication data matches a predetermined authentication code, actuates said door to move to said open configuration;
wherein said processor, when executing said additional programming instructions, is operable to block the energizing of said alarm when said authentication data matches said predetermined authentication code.

6. The theft detection system as in claim 5, wherein said authentication device is taken from a group consisting of a combination lock, a keypad, a biometric sensor, a retinal scanner, and a fingerprint scanner.

7. The theft detection system as in claim 5, wherein said fixed-position security device includes a timer in data communication with said processor and operable to count a predetermined quantity of time said alarm is de-energized after a validated authentication.

8. The theft detection system as in claim 5, further comprising a current detector mounted to said housing of said fixed-position security device that is operable to detect if an electrical circuit has been interrupted or severed.

9. The theft detection system as in claim 1, wherein said fixed-position security device includes a supplemental camera positioned in said interior area of said housing and operable to record a photograph or video when energized by said supplemental motion sensor.

10. A method for detecting theft, comprising:
detecting movement of a portable security device and generating movement data;
said portable security device transmitting a theft alert signal when said movement data is indicative of movement of the portable security device;
a mobile communications device executing a software application for receiving said primary theft alert signal indicative of said detecting movement of the portable security device;
said mobile communication device executing said software application operable for causing a theft alert action when said primary theft alert signal is indicative of said detecting movement of the portable security device;
detecting motion via a supplemental motion sensor positioned inside an interior area of a fixed-position security device;
energizing an alarm associated with the fixed-position security device to emit an audible warning if motion is detected within said interior area of the fixed-position security device.

11. The method for detecting theft as in claim 10, further comprising recording via a camera in said portable security device a photograph or a video proximate said portable security device after detecting movement of the portable security device.

12. The method for detecting theft as in claim 11, further comprising:
generating real-time geographic position data using a global position satellite (GPS) module associated with said portable security device that is indicative of a location of the portable security device;
transmitting said geographic position data along with said movement data.

13. The method for detecting theft as in claim 10,
further comprising recording, via a camera positioned in said interior area of said fixed-position security device, a photograph or a video proximate said fixed-position security device after detecting motion within said security device.

14. The method for detecting theft as in claim 10, further comprising:
said fixed-position security device receiving authentication data;
using said received authentication data, authenticating an attempted access to a door that regulates access to the interior area of the housing, said door being pivotally movable between an open configuration allowing access to said interior area when said authentication data is indicative of an authorized entry and a closed configuration preventing access to said interior area when said authentication data is indicative of an unauthorized entry.

15. The method for detecting theft as in claim 14, wherein said authentication data is received from an authentication device positioned on said door of said housing.

16. The method for detecting theft as in claim 15, wherein said authentication device is taken from a group consisting of a combination lock, a keypad, a biometric sensor, a retinal scanner, and a fingerprint scanner.

17. The method for detecting theft as in claim 14, comprising disabling said alarm of said fixed-position security device for a predetermined amount of time when said authentication data is indicative of an authorized entry.

18. The theft detection system as in claim 10, wherein said theft alert action includes energizing one of an audio alarm or a visual alarm associated with said portable security device.

\* \* \* \* \*